(12) United States Patent
Sathianathan et al.

(10) Patent No.: US 6,371,721 B1
(45) Date of Patent: Apr. 16, 2002

(54) GAS TURBINE ENGINE BLADE CONTAINMENT ASSEMBLY

(75) Inventors: Sivasubramaniam K Sathianathan, Burton on Trent; Ian G Martindale, Derby; David Geary, Derby; Julian M Reed, Derby, all of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/665,580

(22) Filed: Sep. 18, 2000

(30) Foreign Application Priority Data

Sep. 25, 1999 (GB) .............................................. 9922619

(51) Int. Cl.⁷ .............................................. F01D 21/00
(52) U.S. Cl. .......................................... 415/9; 415/200
(58) Field of Search .......................... 415/9, 173.4, 200

(56) References Cited

U.S. PATENT DOCUMENTS

| | | | | |
|---|---|---|---|---|
| 4,417,848 A | * | 11/1983 | Dembeck | 415/200 |
| 4,648,795 A | * | 3/1987 | Lardellier | 415/9 |
| 5,388,959 A | * | 2/1995 | Forrester et al. | 415/173.4 |
| 5,437,538 A | | 8/1995 | Mitchell | |
| 5,486,086 A | | 1/1996 | Bellia | |
| 5,642,985 A | * | 7/1997 | Spear et al. | 416/238 |
| 5,823,739 A | * | 10/1998 | Van Duyn | 415/9 |
| 6,149,380 A | * | 11/2000 | Kuzniar et al. | 415/9 |
| 6,179,551 B1 | * | 1/2001 | Sathianathan et al. | 415/9 |
| 6,206,631 B1 | * | 3/2001 | Schilling | 415/9 |

FOREIGN PATENT DOCUMENTS

GB  1 369 229  10/1974

* cited by examiner

Primary Examiner—Christopher Verdier
(74) Attorney, Agent, or Firm—W. Warren Taltavull; Manelli Denison & Selter PLLC

(57) ABSTRACT

A turbofan gas turbine engine (10) comprises a fan rotor (32) carrying a plurality of radially extending fan blades (34). A fan blade containment assembly (38) surrounds the fan blades (34) and the fan blade containment assembly (38) comprises a generally cylindrical, or frustoconical, metal casing (40). The casing (40) comprises an annular hook (54) positioned axially upstream of the tip (37) of the fan blade (34). The annular hook (54) extends in a radially inwardly and axially downstream direction from the metal casing (40) towards the tip (37) of the fan blade (34). The metal casing (40) has a containment portion (A) downstream of the annular hook (54) and substantially in the plane of the leading edge of the tip (37) of the fan blade (34). The containment portion (A) of the casing (40) has a greater diameter than the diameter of the casing (40) at the annular hook (54) to restrain upstream movement of a detached fan blade (34).

16 Claims, 2 Drawing Sheets

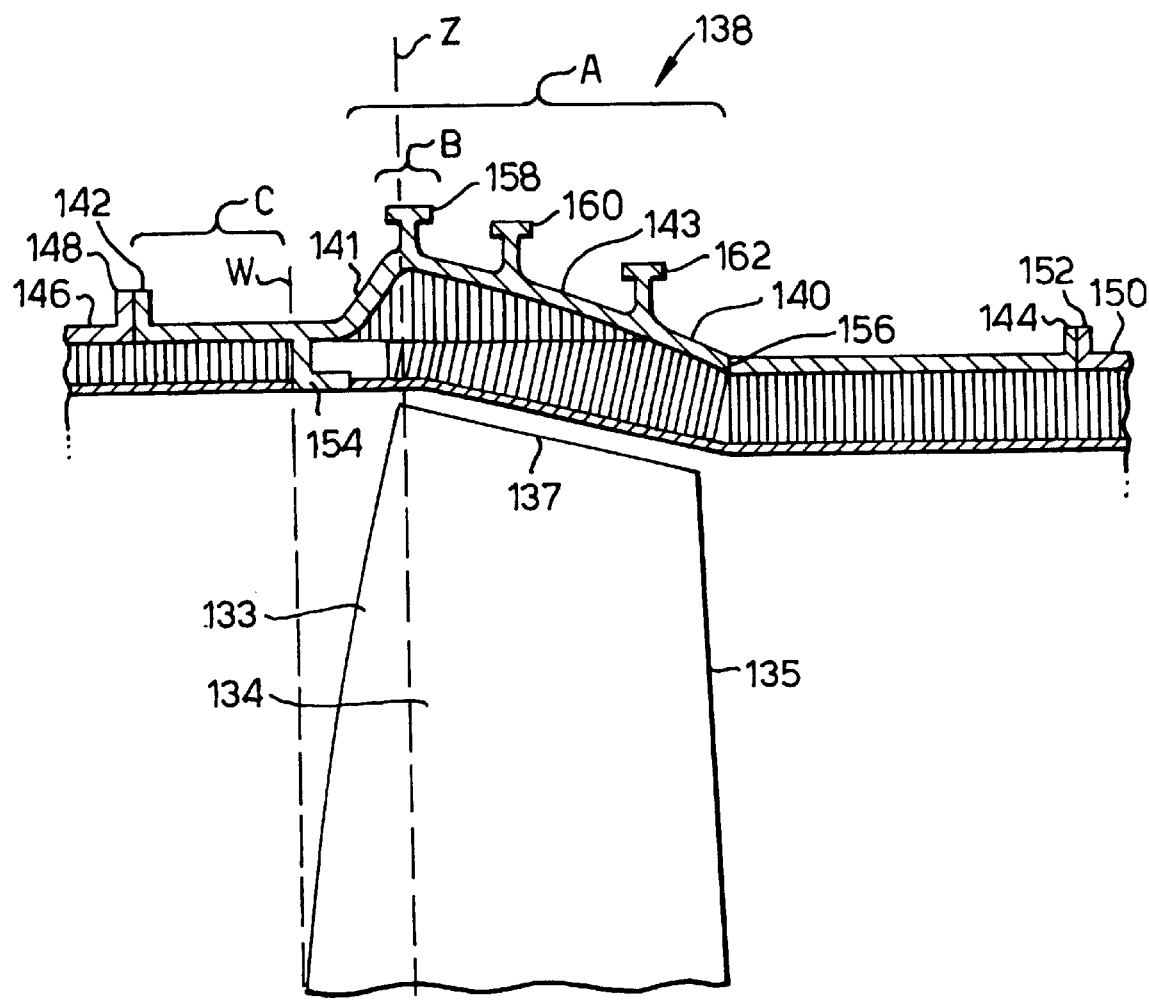

GAS TURBINE ENGINE BLADE CONTAINMENT ASSEMBLY

FIELD OF THE INVENTION

The present invention relates to gas turbine engine casings, particularly gas turbine engine fan casings and turbine casings, more particularly to an improved blade containment assembly for use within or forming a part of the gas turbine engine casing.

BACKGROUND OF THE INVENTION

Turbofan gas turbine engines for powering aircraft conventionally comprise a core engine, which drives a fan. The fan comprises a number of radially extending fan blades mounted on a fan rotor enclosed by a generally cylindrical fan casing. The core engine comprises one or more turbines, each one of which comprises a number of radially extending turbine blades enclosed by a cylindrical, or frustoconical, casing.

There is a remote possibility that with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above mentioned containment casings. In the event that a blade becomes detached it passes through the casing and is contained by the fibrous material.

However, the relatively thick containment casings are relatively heavy, the relatively thin casings enclosed by the fibrous material are lighter but are more expensive to manufacture. The relatively thick casings with fibrous material are both heavier and more expensive to manufacture.

SUMMARY OF THE INVENTION

Accordingly the present invention seeks to provide a novel gas turbine engine casing which overcomes the above mentioned problems.

Accordingly the present invention provides a gas turbine engine rotor blade containment assembly comprising a generally cylindrical, or frustoconical, casing arranged in operation coaxially around a rotor carrying a plurality of rotor blades, the casing having an upstream portion upstream of a plane containing the most upstream point of the leading edge of the rotor blades, the casing having a containment portion downstream of the plane containing the most upstream point of the leading edge of the rotor blades, at least a part of the containment portion of the casing having a greater diameter than the diameter of the upstream portion of the casing, the containment portion having a zone substantially in the plane of the leading edge of the tips of the rotor blades, the containment portion of the casing having a maximum diameter in the zone substantially in the plane of the leading edge of the tips of the rotor blades to restrain upstream movement of a detached rotor blade.

Preferably the containment portion progressively increases in diameter from the upstream portion of the casing to the zone substantially in the plane of the leading edge of the tips of the rotor blades and the containment portion progressively increases in diameter from a plane containing or downstream of the trailing edges of the road for blades to form a substantially radially outwardly dished shape in the casing.

Preferably the casing comprises an annular member positioned axially upstream of the tip of the rotor blade, the annular member extending in a radially inwardly direction from the metal casing, the containment portion being downstream of the annular member, the containment portion of the casing having a greater diameter than the diameter of the casing at the annular hook.

Preferably the annular member is substantially in the plane containing the most upstream point of the leading edge of the rotor blades.

Preferably the annular member is an annular hook extending in a radially inwardly and axially downstream direction from the casing towards the tips of the rotor blades.

Preferably the containment portion of the casing is thicker than the remainder of the casing.

Preferably the containment portion comprises one or more curved lines in axial cross-section.

Alternatively the containment portion comprises one or more straight lines in axial cross-section.

Preferably the containment portion comprises at least one circumferentially extending rib.

Preferably a rib is arranged substantially in or adjacent the plane containing the leading edge of the tips of the rotor blades. Preferably a rib is arranged substantially in a plane containing the mid-chord of the rotor blades. Preferably a rib is arranged substantially in a plane upstream of the trailing edges of the rotor blades.

Preferably the rotor blade is a forwardly swept rotor blade.

Preferably the casing is a fan casing and the rotor blades are fan blades.

Alternatively the casing is a turbine casing and the rotor blades are turbine blades.

Preferably the casing is formed from a metal, for example titanium, an alloy of titanium, aluminium, an alloy of aluminium or steel.

The present invention also provides a gas turbine engine comprising a rotor carrying a plurality of rotor blades, a rotor blade containment assembly comprising a generally cylindrical, or frustoconical, casing arranged coaxially around the rotor and rotor blades, the casing having an upstream portion upstream of a plane containing the most upstream point of the leading edge of the rotor blades, the casing having a containment portion downstream of the plane containing the most upstream point of the leading edge of the rotor blades, at least a part of the containment portion of the casing having a greater diameter than the diameter of the upstream portion of the casing, the containment portion having a zone substantially in the plane of the leading edge of the tips of the rotor blades, the containment portion of the casing having a maximum diameter in the zone substantially in the plane of the leading edge of the tips of the rotor blades to restrain upstream movement of a detached rotor blade.

BRIEF DESCRIPTION OF THE DRAWINGS

The present invention will be more fully described by way of example with reference to the accompanying drawings in which:

FIG. 3 is an enlarged view of an alternative fan blade containment assembly shown in FIG. 1.

DETAILED DESCRIPTION OF THE INVENTION

Figure 1:
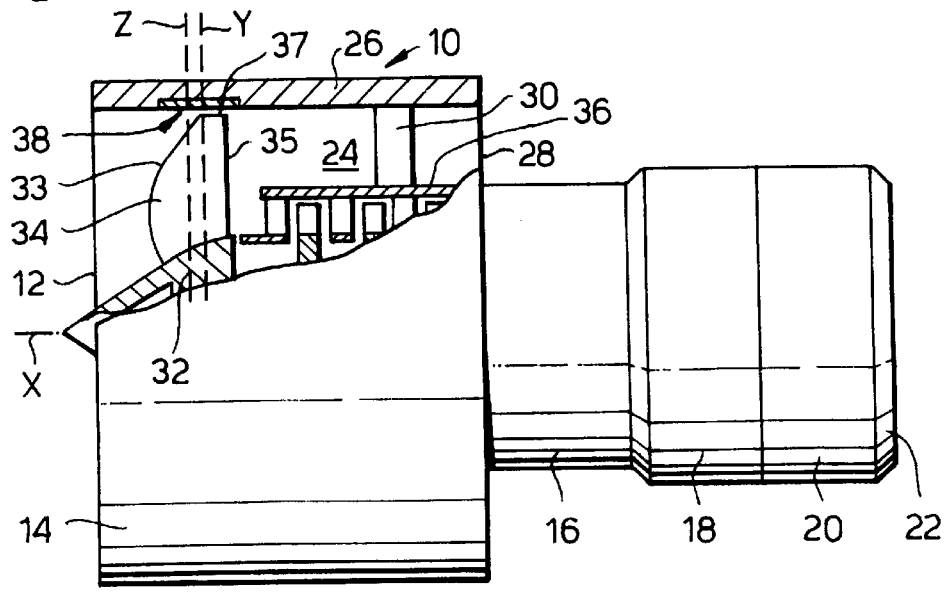
FIG. 1 is a partially cut away view of a gas turbine engine having a fan blade containment assembly according to the present invention.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section 20 also comprises a turbine to drive the fan section 14 via a shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane Y of the fan blades 34. The fan blades 34 have a leading edge 33, a trailing edge 35 and a tip 37.

Figure 2:
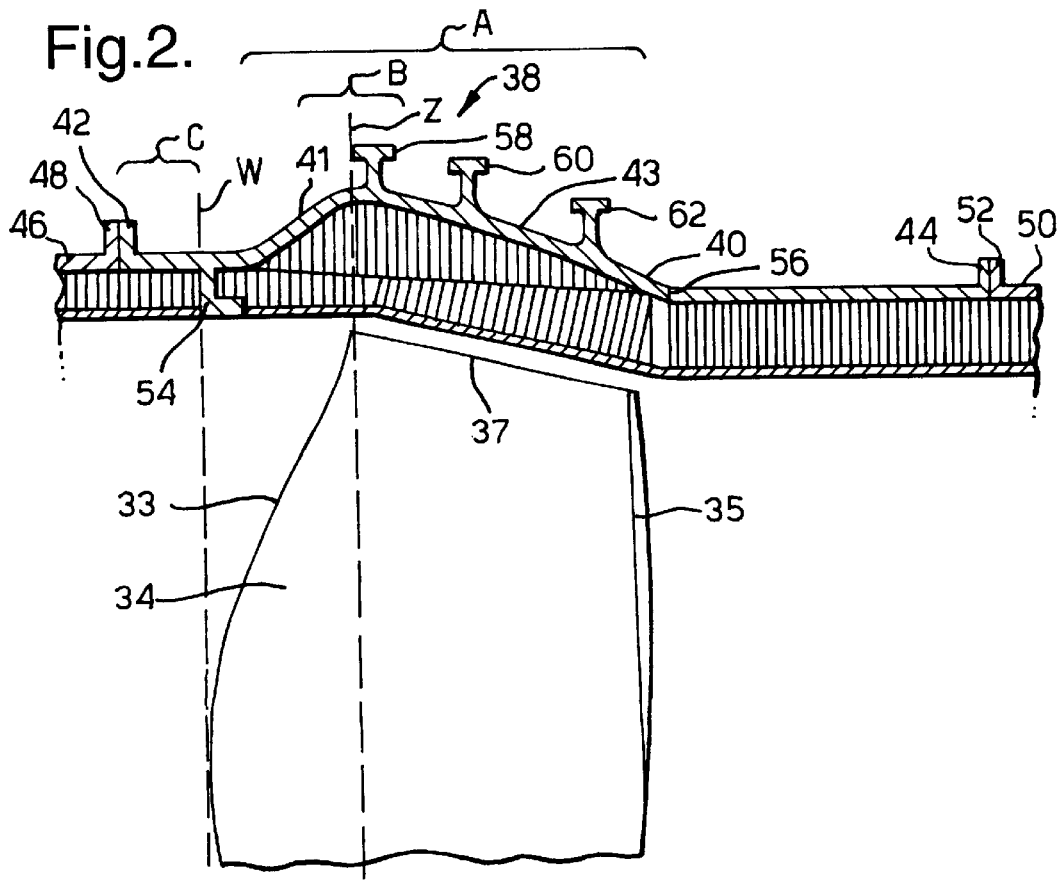
FIG. 2 is an enlarged view of the fan blade containment assembly shown in FIG. 1.

The fan casing 26 and fan blade containment assembly 38 is shown more clearly in FIG. 2. The fan blades 34 are forwardly swept fan blades. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 comprises a downstream flange 44 by which the fan blade containment assembly 38 is connected to a flange 52 on a rear portion 50 of the fan casing 26. The metal casing 40 comprises an annular hook 54 positioned axially upstream of the leading edge 33 of the tip 37 of the fan blade 34. The annular hook 54 extends in a radially inwardly and axially downstream direction from the metal casing 40 towards the tip 37 of the fan blade 34. The annular hook 54 is substantially in a plane W, perpendicular to the axis X of the gas turbine engine 10, containing the most upstream point of the leading edge 33 of the fan blades 34.

The metal casing 40 has a containment portion A downstream of the annular hook 54 and upstream of a plane 56, perpendicular to the axis X of the gas turbine engine 10, passing through the metal casing 40 and containing, or downstream of, the trailing edge 35 of the fan blades. 34. The metal casing 40 has an upstream portion C which is upstream of the plane W. The containment portion A has a greater diameter than the diameter of the metal casing 40 at the annular hook 54 and the upstream portion C of the metal casing 40. The containment portion A has a zone B substantially in a plane Z, perpendicular to the axis X of the gas turbine engine 10, containing the leading edge 33 of the tip 37 of the fan blade 34. The containment portion A of the metal casing 40 reaches a maximum diameter in the zone B. The containment portion A comprises one or more curved lines in axial cross-section, one or more straight lines in axial cross-section or at least one curved line and at least one straight line in axial cross-section to interconnect the annular hook 54 and the plane 56 of the metal casing 40 to form a substantially radially outwardly dished shaped in the metal casing 40. The containment portion A progressively increases in diameter from the annular hook 54 and progressively increases in diameter from the plane 56 to the maximum diameter in zone B.

In the particular example shown in FIG. 2, the containment portion A comprises a frustoconical portion 41 which increases in diameter in a downstream direction from the annular hook 54 to the maximum diameter in Zone B and then a frustoconical portion 43 which decreases in diameter downstream direction from the maximum diameter in Zone B to the plane 56.

The containment portion A of the metal casing 40 is thicker than the remainder of the metal casing 40. The containment portion A comprises a plurality of circumferentially extending ribs 58, 60 and 62. The ribs 58, 60 and 62 are T-shaped in axial cross-section. The rib 58 is arranged substantially in, or adjacent, the plane Z containing the leading edge 33 of the tip 36 of the fan blade 34. The rib 60 is arranged substantially in a plane containing the mid-chord of the fan blade 34 and the rib 62 is arranged substantially in a plane upstream of the trailing edge 35 of the fan blade 34.

The rib 58 as shown in FIG. 2 is arranged at the point of maximum diameter in Zone B and the ribs 60 and 62 are arranged on the frustoconical portion 43.

It may be desirable in some circumstances to provide a number of continuous layers of a strong fibrous material wound around the metal casing 40 to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the metal casing 40 and the continuous layers of fibrous material.

In operation of the gas turbine engine 10, in the event that a fan blade 34 becomes detached the tip 37 of the fan blade 34 strikes the metal casing 40 in the containment region A. The metal casing 40 is rigid and is designed to substantially restrain a fan blade 34 from passing therethrough. The dished shape of the containment region A of the metal casing 40, in particular the large diameter zone B with the progressively increasing diameter from the annular hook 54 to the large diameter zone B, restrains upstream movement of the detached fan blade 34. The dished shape of the containment region A also provides improved capture and retention of portions of a fan blade 34. The hook 54 also provides a further feature to restrain upstream movement of the detached fan blade 34 in the event that the containment region A does not remove all the velocity, or energy, from the detached fan blade 34. The hook 54 also prevents secondary debris being ejected in an upstream direction into the intake.

An alternative fan casing and fan blade containment assembly 138 is shown more clearly in FIG. 3. The fan blades 134 are conventional wide chord, or narrow chord, fan blades. The fan blade containment assembly 138 comprises a metal cylindrical, or frustoconical, casing 140. The metal casing 140 comprises an upstream flange 142 by which the fan blade containment assembly 138 is connected to a flange 148 on an intake assembly 146 of the fan casing 126. The metal casing 40 comprises a downstream flange 144 by which the fan blade containment assembly 138 is connected to a flange 152 on a rear portion 150 of the fan casing 126.

The metal casing 140 comprises an annular hook 154 positioned axially upstream of the leading edge 133 of the tip 137 of the fan blade 134. The annular hook 154 extends in a radially inwardly and axially downstream direction from the metal casing 140 towards the tip 137 of the fan blade 134. The annular hook 154 is substantially in a plane W containing the most upstream point of the leading edge 133 of the fan blades 134.

The metal casing 140 has a containment portion A downstream of the annular hook 154 and upstream of a plane 156, perpendicular to the axis X of the gas turbine engine 10, passing through the metal casing 140 and containing, or downstream of, the trailing edge 135 of the fan blades 134. The metal casing 140 has an upstream portion C which is upstream of the plane W. The containment portion A has a greater diameter than the diameter of the metal casing 140 at the annular hook 154 and the upstream portion C of the metal casing 140. The containment portion A has a zone B substantially in a plane Z, perpendicular to the axis X of the gas turbine engine 10, containing the leading edge 133 of the tip 137 of the fan blade 134. The containment portion A of the metal casing 140 reaches a maximum diameter in the zone B. The containment portion A comprises one or more curved lines in axial cross-section, one or more straight lines in axial cross-section or at least one curved line and at least one straight line in axial cross-section to interconnect the annular hook 154 and the plane 156 of the metal casing 140 to form a substantially radially outwardly dished shaped in the metal casing 140. The containment portion A progressively increases in diameter from the annular hook 154 and progressively increases in diameter from the plane 156 to the maximum diameter in zone B.

In the particular example shown in FIG. 3 the containment portion A comprises a frustoconical portion 141 which increases in diameter in a downstream direction from the annular hook 154 to the maximum diameter in zone B and then a frustoconical portion 143 which decreases in diameter in a downstream direction from the maximum diameter in zone B to the plane 156.

The containment portion A of the metal casing 140 is thicker than the remainder of the metal casing 140. The containment portion A comprises a plurality of circumferentially extending ribs 158, 160 and 162. The ribs 158, 160 and 162 are T-shaped in axial cross-section. The rib 158 is arranged substantially in, or adjacent, the plane Z containing the leading edge 133 of the tip 136 of the fan blade 134. The rib 160 is arranged substantially in a plane containing the mid-chord of the fan blade 134 and the rib 162 is arranged substantially in a plane upstream of the trailing edge 135 of the fan blade 134.

The rib 158 as shown in FIG. 3 is arranged at the point of maximum diameter in zone B and the ribs 160 and 162 are arranged on the frustoconical portion 143.

It may be desirable in some circumstances to provide a number of continuous layers of a strong fibrous material wound around the metal casing 140 to further increase the energy absorbing capability of the fan blade containment assembly 138. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the metal casing 140 and the continuous layers of fibrous material.

In operation of the gas turbine engine 10, in the event that a fan blade 134 becomes detached the tip 137 of the fan blade 134 strikes the metal casing 140 in the containment region A. The metal casing 40 is rigid and is designed to substantially restrain a fan blade 134 from passing therethrough. The dished shape of the containment region A of the metal casing 140, in particular the large diameter zone B with the progressively increasing diameter from the annular hook 154 to the large diameter zone B, restrains upstream movement of the detached fan blade 134. The dished shape of the containment region A also provides improved capture and retention of portions of a fan blade 134. The hook 154 also provides a further feature to restrain upstream movement of the detached fan blade 134 in the event that the containment region A does not remove all the velocity, or energy, from the detached fan blade 134. The hook 154 also prevents secondary debris being ejected in an upstream direction into the intake.

Thus the embodiment in FIG. 3 differs from that in FIG. 2 only in having conventional fan blades with a resulting smaller axial distance between the planes W and Z.

The metal casing may be manufactured from titanium, titanium alloy, aluminium, aluminium alloy, nickel, nickel alloy and steel.

The invention has been described with reference to a fan blade containment assembly, however it is equally applicable to a compressor blade containment assembly and a turbine blade containment assembly.

The invention has been described with reference to a metal casing, however the invention is not limited to a metal casing. The invention has been described with reference to a hook, the hook is a preferred feature of the invention, but the hook may be dispensed with in some circumstances. In that instance the zone B is at a greater diameter than the diameter of a portion of the casing upstream of the tip of the rotor blade.

Although the invention has been described with reference to an annular hook extending radially inwardly from the metal casing it may be possible to use other annular members which extend radially inwardly from the metal casing for example an annular flange.

The description has pointed out that all the containment portion of the casing has a greater diameter than the upstream portion of the casing. However, it may be possible for only a part of the containment portion to have a greater diameter than the upstream portion, in the zone of the containment portion which has the maximum diameter.

We claim:

1. A gas turbine engine rotor blade containment assembly comprising a generally cylindrical, or frustoconical, casing arranged in operation coaxially around a rotor carrying a plurality of rotor blades, the casing having an upstream portion upstream of a plane containing the most upstream point of the leading edge of the rotor blades, the casing having a containment portion downstream of the plane containing the most upstream point of the leading edge of the rotor blades, at least a part of the containment portion of the casing having a greater diameter than the diameter of the upstream portion of the casing, the containment portion having a zone substantially in the plane of the leading edge of the tips of the rotor blades, the containment portion of the casing having a maximum diameter in the zone substantially in the plane of the leading edge of the tips of the rotor blades to restrain upstream movement of a detached rotor blade, the casing being rigid to substantially restrain a fan blade from passing therethrough, said containment portion progressively increasing in diameter from the upstream portion of the casing to the zone substantially in the plane of the leading edge of the tips of the rotor blades and the containment portion progressively increasing in diameter from a plane containing or downstream of the trailing edges of the rotor blades to form a substantially radially outwardly dished shape in the casing.

2. A gas turbine engine rotor blade containment assembly as claimed in claim 1 wherein the casing comprises an annular member positioned axially upstream of the tips of the rotor blades, an annular hook extending in a radially inwardly direction from the metal casing, the containment portion being downstream of the annular member, the containment portion of the casing having a greater diameter than the diameter of the casing at the annular member.

3. A gas turbine engine rotor blade containment assembly as claimed in claim 1 wherein the containment portion comprises one or more curved lines in axial cross-section.

4. A gas turbine engine rotor blade containment assembly as claimed in claim 1 wherein the containment portion comprises one or more straight lines in axial cross-section.

5. A gas turbine engine rotor blade containment assembly as claimed in claim 1 wherein the containment portion comprises at least one circumferentially extending rib.

6. A gas turbine engine rotor blade containment assembly as claimed in claim 5, wherein said rib is arranged substantially in or adjacent the plane containing the leading edge of the tips of the rotor blades.

7. A gas turbine engine rotor blade containment assembly as claimed in claim 5 wherein a rib is arranged substantially in a plane containing the mid-chord of the rotor blades.

8. A gas turbine engine rotor blade containment assembly as claimed in claim 5 wherein a rib is arranged substantially in a plane upstream of the trailing edges of the rotor blades.

9. A gas turbine engine rotor blade containment assembly as claimed in claim 1 wherein the containment portion of the casing is thicker than the remainder of the casing.

10. A gas turbine engine rotor blade containment assembly as claimed in claim 1 wherein the rotor blade is a forwardly swept rotor blade.

11. A gas turbine engine rotor blade containment assembly as claimed in claim 1 wherein the casing is a fan casing and the rotor blades are fan blades.

12. A gas turbine engine rotor blade containment assembly as claimed in claim 1 wherein the casing is a turbine casing and the rotor blades are turbine blades.

13. A gas turbine engine rotor blade containment assembly as claimed in claim 1 wherein the casing is formed from a metal.

14. A gas turbine engine rotor blade containment assembly as claimed in claim 13 wherein the casing is formed from titanium, an alloy of titanium, aluminium, an alloy of aluminium or steel.

15. A gas turbine engine comprising a rotor carrying a plurality of rotor blades, a rotor blade containment assembly comprising a generally cylindrical, or frustoconical, casing arranged coaxially around the rotor and rotor blades, the casing having an upstream portion upstream of a plane containing the most upstream point of the leading edge of the rotor blades, the casing having a containment portion downstream of the plane containing the most upstream point of the leading edge of the rotor blades, at least a part of the containment portion of the casing having a greater diameter than the diameter of the upstream portion of the casing, the containment portion having a zone substantially in the plane of the leading edge of the tips of the rotor blades, the containment portion of the casing having a maximum diameter in the zone substantially in the plane of the leading edge of the tips of the rotor blades to restrain upstream movement of a detached rotor blade, the casing being rigid to substantially restrain a fan blade from passing therethrough, said containment portion progressively increasing in diameter from the upstream portion of the casing to the zone substantially in the plane of the leading edge of the tips of the rotor blades and the containment portion progressively increasing in diameter from a plane containing or downstream of the trailing edges of the rotor blades to form a substantially radially outwardly dished shape in the casing.

16. A gas turbine engine comprising a rotor carrying a plurality of rotor blades, a rotor blade containment assembly comprising a generally cylindrical, or frustoconical, casing arranged coaxially around the rotor and rotor blades, the casing having an upstream portion upstream of a plane containing the most upstream point of the leading edge of the rotor blades, the casing having a containment portion downstream of the plane containing the most upstream point of the leading edge of the rotor blades, at least a part of the containment portion of the casing having a greater diameter than the diameter of the upstream portion of the casing, the containment portion having a zone substantially in the plane of the leading edge of the tips of the rotor blades, the containment portion of the casing having a maximum diameter in the zone substantially in the plane of the leading edge of the tips of the rotor blades to restrain upstream movement of a detached rotor blade, the containment portion progressively increasing in diameter from the upstream portion of the casing to the zone substantially in the plane of the leading edge of the tips of the rotor blades and the containment portion progressively increasing in diameter from a plane containing or downstream of the trailing edges of the rotor blades to form a substantially radially outwardly dished shape in the casing, wherein the casing comprises an annular member positioned axially upstream of the tips of the rotor blades, an annular hook extending in a radially inwardly direction from the casing, the containment portion being downstream of the annular member, the containment portion of the casing having a greater diameter than the diameter of the casing at the annular member, said annular member being substantially in the plane containing the most upstream point of the leading edge of the rotor blades.

* * * * *